US012456573B2

(12) United States Patent
Wedin et al.

(10) Patent No.: US 12,456,573 B2
(45) Date of Patent: Oct. 28, 2025

(54) TRANSFORMER HAVING A TERTIARY WINDING

(71) Applicant: Hitachi Energy Ltd, Zürich (CH)

(72) Inventors: Erik Carl Wedin, Karlstad (SE); Mattias Viksten, Hudiksvall (SE); Peter Astrand, Bälinge (SE)

(73) Assignee: HITACHI ENERGY LTD, Zurich (CH)

( * ) Notice: Subject to any disclaimer, the term of this patent is extended or adjusted under 35 U.S.C. 154(b) by 0 days.

(21) Appl. No.: 18/834,311

(22) PCT Filed: Jun. 8, 2023

(86) PCT No.: PCT/EP2023/065417
§ 371 (c)(1),
(2) Date: Jul. 30, 2024

(87) PCT Pub. No.: WO2023/237700
PCT Pub. Date: Dec. 14, 2023

(65) Prior Publication Data

US 2024/0420885 A1 Dec. 19, 2024

(30) Foreign Application Priority Data

Jun. 8, 2022 (EP) .................................... 22177915

(51) Int. Cl.

| | |
|---|---|
| ***H01F 27/38*** | (2006.01) |
| ***H01F 30/10*** | (2006.01) |
| ***H01F 30/12*** | (2006.01) |

(52) U.S. Cl.
CPC ............. *H01F 27/38* (2013.01); *H01F 30/10* (2013.01); *H01F 30/12* (2013.01)

(58) Field of Classification Search
CPC ..... H01F 30/10; H01F 30/12; H01F 27/00–40
See application file for complete search history.

(56) References Cited

U.S. PATENT DOCUMENTS 2,497,499 A * 2/1950 Hedding .................. G05F 1/33 363/90
3,579,165 A 5/1971 Johnson
4,581,573 A 4/1986 Dobsa et al.
(Continued)

FOREIGN PATENT DOCUMENTS

AT 406204 B 3/2000
CN 101681716 A 3/2010
(Continued)

OTHER PUBLICATIONS

International Search Report and Written Opinion of the International Searching Authority, International Application No. PCT/EP2023/065417, mailed Sep. 22, 2023, 13 pages.
(Continued)

*Primary Examiner* — Tuyen T Nguyen
(74) *Attorney, Agent, or Firm* — Sage Patent Group

(57) ABSTRACT

A transformer including a core, such as, for example, a single-phase core, that includes a plurality of wound limbs, primary and secondary concentric windings formed on each limb of the plurality of wound limbs, and at least one tertiary concentric winding formed on fewer than all limbs of the plurality of wound limbs.

16 Claims, 4 Drawing Sheets

(56) References Cited

U.S. PATENT DOCUMENTS

| | | | |
|---|---|---|---|
| 4,631,511 | A | 12/1986 | Sylvester, Jr. et al. |
| 2010/0194373 | A1 | 8/2010 | Hamberger et al. |

FOREIGN PATENT DOCUMENTS

| | | | | | |
|---|---|---|---|---|---|
| JP | 60039810 | A | * | 3/1985 | ............. H01F 30/12 |
| JP | 62084505 | A | * | 4/1987 | |
| JP | 09069447 | A | * | 3/1997 | |
| JP | H11186070 | A | | 7/1999 | |
| JP | 3544465 | B2 | * | 7/2004 | |

OTHER PUBLICATIONS

Brazilian Office Action, Brazillian Application No. BR112024011935-1, mailed Mar. 19, 2025, 6 pages.
Chinese Office Action, Chinese Patent Application No. 202380016346.8, mailed Mar. 19, 2025, 7 pages.

* cited by examiner

TRANSFORMER HAVING A TERTIARY WINDING

CROSS REFERENCE TO RELATED APPLICATIONS

This application is a 35 U.S.C. § 371 national stage application of PCT International Application No. PCT/EP2023/065417 filed on Jun. 8, 2023, which in turn claims priority to European Patent Application No. 22177915.0, filed on Jun. 8, 2022, the disclosures and content of which are incorporated by reference herein in their entireties.

TECHNICAL FIELD

The present disclosure relates to a transformer having more than one limb with windings disposed therearound, with fewer than all of the limbs having a tertiary winding formed around them.

BACKGROUND

A transformer is a passive component that transfers electrical energy from one electrical circuit to another circuit, or multiple circuits. Some transformers are equipped with more than two voltage systems. In some cases, one or more voltage systems have much lower power requirements than other voltage systems. Such voltage systems with lower power requirements in many cases incur excessive costs compared to the amount of power they deliver due to e.g., relatively large minimum sizes of windings. Another drawback for low power voltage systems is that they can deliver a very high short-circuit current, which is problematic for the equipment connected to these voltage systems. An example of such voltage systems are tertiary windings.

In some applications, it is advantageous to equip power transformers with a tertiary voltage system. Thus, a transformer may have, in addition to primary and secondary windings, a tertiary winding. A tertiary winding redistributes the flow of fault current and thus stabilizes, or balances, neutral point voltage, and it can also reduce a zero sequence impedance of the transformer. Besides reducing voltage imbalance in a transformer, the tertiary winding can also be used to supply an auxiliary load, e.g., substation auxiliaries, at a voltage different from those of the primary and secondary windings. In many of applications employing a tertiary voltage system, the power requirements of the tertiary voltage system are lower than the primary and secondary power rating.

In some cases, the power of the larger voltage system is so high that a single wound limb per phase i.e., a limb having windings, in a transformer may not be used. Various other factors such as, e.g., voltage rating, impedance, transport restriction, losses, short-circuit strength, etc., may determine whether more than one wound limb is needed. In some cases, typically for units with high power rating, a transformer may be designed with more than one wound limb per phase in order to meet all requirements with an optimal design. The use of multiple wound limbs may however further exacerbate the drawbacks associated with transformers having a tertiary voltage system, i.e., the high costs and a great risk of high short-circuit currents.

Accordingly, there is a need for improved transformers comprising a tertiary voltage system.

SUMMARY

Accordingly, an object of the present disclosure is to provide a transformer, such as a transformer comprising a single-phase core, with multiple wound limbs having a tertiary winding on fewer than all limbs of the multiple wound limbs. For example, the single-phase transformer in accordance with aspects of the present disclosure may have only one of the wound limbs having a tertiary winding disposed around it.

Instead of utilizing identical designs on each limb in a single-phase transformer with multiple wound limbs, i.e., limbs with windings disposed therearound, different number of windings can be used in one or more of the wound limbs, in accordance with aspects of the present disclosure. In aspects of the present disclosure, all wound limbs of the transformer may have the same or similar primary and secondary windings. The main difference between the wound limbs is that one or more, but not all, of these limbs do not include a tertiary winding. Thus, a tertiary winding may be omitted at one or more, but fewer than all, of the transformer wound limbs. This will result in decrease in costs because fewer windings will need to be produced and maintained. Moreover, the short-circuit current for equipment connected to the transformer is reduced. For example, for a transformer with two wound limbs, a number of windings and short-circuit current may both be reduced by half, resulting in reduction of manufacturing and transport costs as well as in improved operation of the system including the transformer, due to the reduction in short-circuit current.

According to an aspect of the present disclosure, the above and other objects are achieved by a single-phase transformer comprising a single-phase core that comprises a plurality of wound limbs, primary and secondary concentric windings formed on each limb of the plurality of wound limbs, and a tertiary concentric winding concentric with the primary and secondary windings, formed on at least one limb of the plurality of wound limbs such that fewer than all limbs of the plurality of wound limbs have the tertiary winding.

According to an aspect of the present disclosure, the above object is achieved by a method of reducing a short-circuit current generated by a transformer comprising a single-phase core comprising a plurality of wound limbs. The method comprises forming primary and secondary concentric windings on each limb of the plurality of wound limbs of the transformer, and forming a tertiary concentric winding, concentric with the primary and secondary windings, on at least one limb of the plurality of wound limbs such that fewer than all limbs of the plurality of wound limbs have the tertiary winding.

A single-phase or a three-phase transformer in accordance with aspects of the present disclosure, having a tertiary winding on fewer than all of its wound limbs, may allow reducing manufacturing, transport, and maintenance costs of the transformer and reduces short-circuit current generated by the system comprising the transformer.

DETAILED DESCRIPTION

A conventional transformer may have multiple limbs per phase with windings formed around them, i.e., so called wound limbs, which have identical configurations of the windings disposed around them. The power is typically split equally between the windings of the wound limbs and the windings may be connected in parallel or in series to achieve the full power. Certain issues, discussed herein, may arise in connection with the conventional transformer, related to the identical design or configuration of the wound limbs of the transformer.

Aspects of the present disclosure thus provide a transformer, such as a single-phase transformer or a transformer comprising a single-phase core, with multiple wound limbs having different configurations in that fewer than all of the wound limbs have a tertiary winding wound around them. For example, a tertiary winding may be omitted on all wound limbs of the transformer except one.

Figure 1:
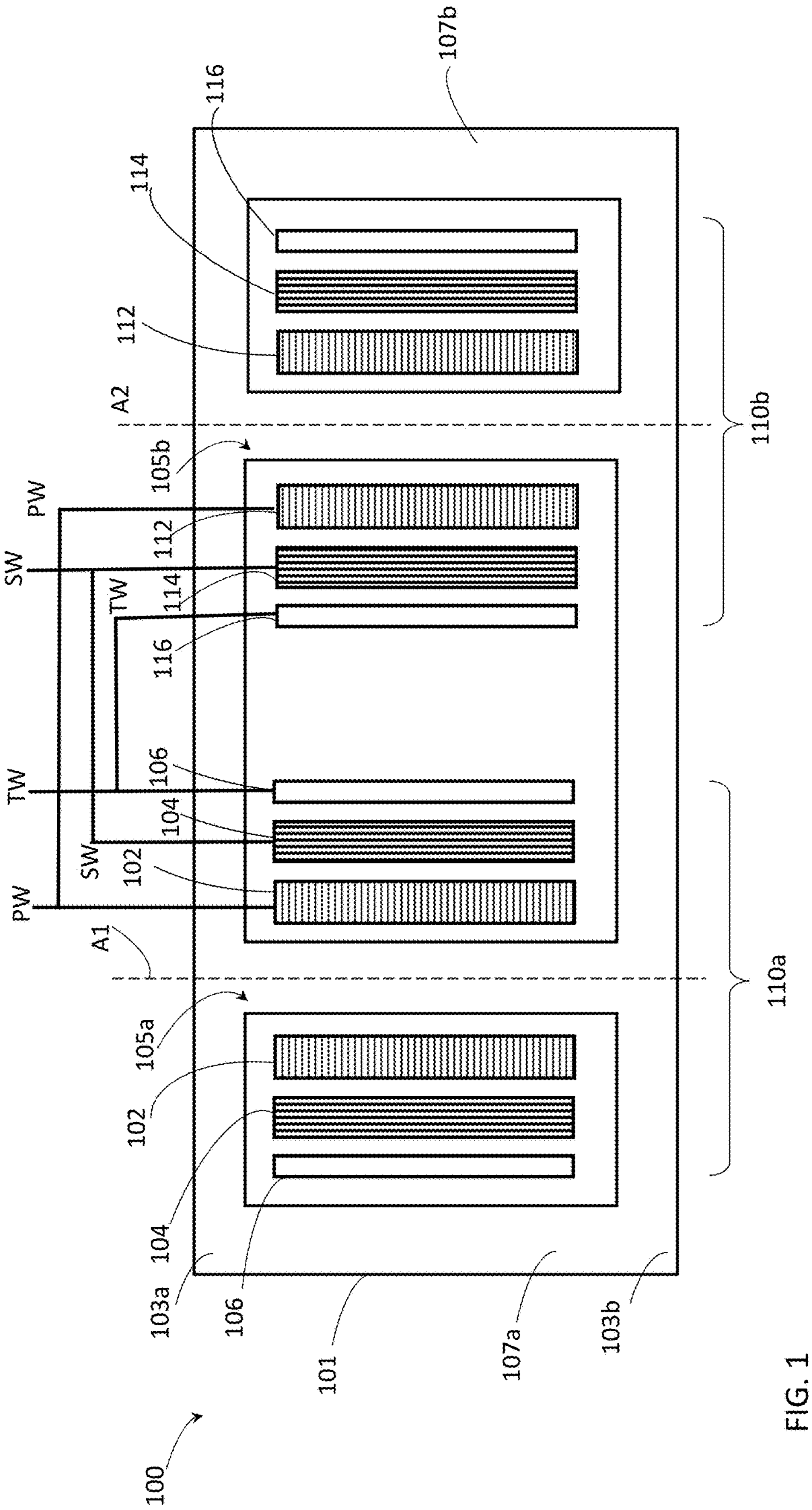
FIG. 1 shows an example of a cross-sectional side view of a transformer comprising two wound limbs each having primary, secondary, and tertiary windings.

FIG. 1 illustrates schematically an example of a conventional transformer 100 having a core 101 comprising upper and lower yokes 103*a*, 103*b* and two vertical posts, poles or limbs 105*a*, 105*b* supported by the yokes 103*a*, 103*b*. The transformer 100 may be a single-phase transformer.

The core limbs 105*a*, 105*b*, which may be referred to as first and second limbs, respectively, may also be referred to herein as wound limbs since they have windings formed around them. The transformer 100 also has two vertical side limbs 107*a*, 107*b* which are not wound limbs since they do not have windings. The wound limbs 105*a*, 105*b* and side limbs 107*a*, 107*b* are vertical portions of the core 101, whereas the upper and lower yokes 103*a*, 103*b* are portions of the core 101 that provide mechanical support to the limbs. The transformer 100 is shown in a vertical cross-section taken through the core 101, along a central diameter of cylinder-like or cylindrical structures formed by the windings of the transformer 100.

It should be appreciated that the two wound limbs 105*a*, 105*b* are shown by way of example only, as the transformer 100 may have more than two wound limbs. As shown in FIG. 1, each limb of the wound limbs 105*a*, 105*b* has primary, secondary, and tertiary concentric windings formed or built radially around the limb, such that the windings together form a cylinder-like structure, referred to herein as a cylindrical structure, with the respective limb passing inside. The windings are coils of a wire wound around a respective limb, such as a ferromagnetic core, to form a cylinder or a sleeve. The first wound limb 105*a* has a primary winding 102, a secondary winding 104, and a tertiary winding 106 formed thereon, forming a first cylindrical structure 110*a*. Similarly, the second wound limb 105*b* has a primary winding 112, a secondary winding 114, and a tertiary winding 116 formed thereon, forming a second cylindrical structure 110*b*. The tertiary windings may be taken as together constituting, connected to, or including a tertiary voltage system of the transformer 100. A primary winding is connected to an AC supply, a secondary winding is connected to an electrical component (load), and a tertiary winding provides balancing and/or auxiliary power. The primary windings are equal in power among the two wound limbs 105*a*, 105*b*. Similarly, the secondary windings are equal in power among the two wound limbs 105*a*, 105*b*. Longitudinal axes A1 and A2 of the first and second cylinder-like structures 110*a*, 110*b*, shown in FIG. 1, may coincide with longitudinal axes of the respective wound limbs 105*a*, 105*b*. Thus, each of the windings is shown in FIG. 1 as two respective parts positioned symmetrically with respect to the longitudinal axis A1 (the windings forming the first cylindrical structure 110*a*) and the longitudinal axis A2 (the windings forming the second cylindrical structure 110*b*).

The windings of the transformer 100 may be connected in parallel or in series to achieve the full power. As shown in FIG. 1, the primary windings 102, 112, marked as “PW”, are connected to one another. Similarly, the secondary windings 104, 114, marked as “SW”, are connected to one another. The tertiary windings 106, 116, marked as “TW”, are also connected to one another. The primary windings 102, 112 may be considered as connected to or including a primary voltage system of the transformer 100, the secondary windings 104, 114 may be considered as connected to or including a secondary voltage system of the transformer 100, and the tertiary windings 106, 116 may be considered as connected to or including a tertiary voltage system of the transformer 100.

The example in FIG. 1 illustrates the transformer 100 having limbs each of which has, in addition to the primary and secondary windings, a tertiary windings. As mentioned above, even though two wound limbs 105*a*, 105*b* are shown, the transformer 100 may have one wound limb or more than two wound limbs. Also, the transformer 100 may or may not have side limbs. FIG. 1 illustrates an example of a transformer in which the power is split identically among several (wound) limbs where each limb has the same or similar design. For example, as in the transformer 100, a conventional transformer may have two identical wound limbs with half-power on each. It should be appreciated that the transformer 100 has various other components that are not shown herein.

Because each wound limb 105*a*, 105*b* of the transformer 100 has the respective tertiary winding 106, 116, such that all wound limb 105*a*, 105*b* have an identical design, certain shortcomings may arise. For example, if one voltage system, such as e.g., a tertiary voltage system, has a low power compared to the other voltage systems, high short-circuit current may be generated, which may negatively affect equipment connected to the transformer. To limit the short-circuit current, additional equipment such as current limiting reactors and other current-limiting devices may be used, which increases the number of components of the systems and thus increases costs. Also, as discussed above, because of the overall relatively large size of the tertiary windings (compared to their rated power), the size of the transformer is affected. Thus, manufacturing, transporting, and operation of power systems employing such transformer(s) may lead to excessive costs compared to the amount of power they deliver.

Accordingly, in aspects of the present disclosure, the above and other related shortcomings are addressed by providing a transformer having multiple wound limbs that each include primary and secondary windings, but in which a tertiary winding is included on fewer than all limbs of the multiple wound limbs. For example, the transformer in accordance with embodiments of the present disclosure may have multiple, e.g., two, three, four or greater than four, wound limbs, only one of which has a tertiary winding formed thereon. More than one wound limbs may have a tertiary winding, but a total number of wound limbs with a tertiary winding is smaller than a total number of the wound limbs in the transformer.

The transformer in accordance with embodiments of the present disclosure may be a single-phase transformer comprising one single-phase core that comprises two or more wound limbs, e.g., two or more wound limbs per phase. One or more, but fewer than all of the two or more wound limbs of the transformer may be wound limb(s) with a tertiary winding.

Figure 2:
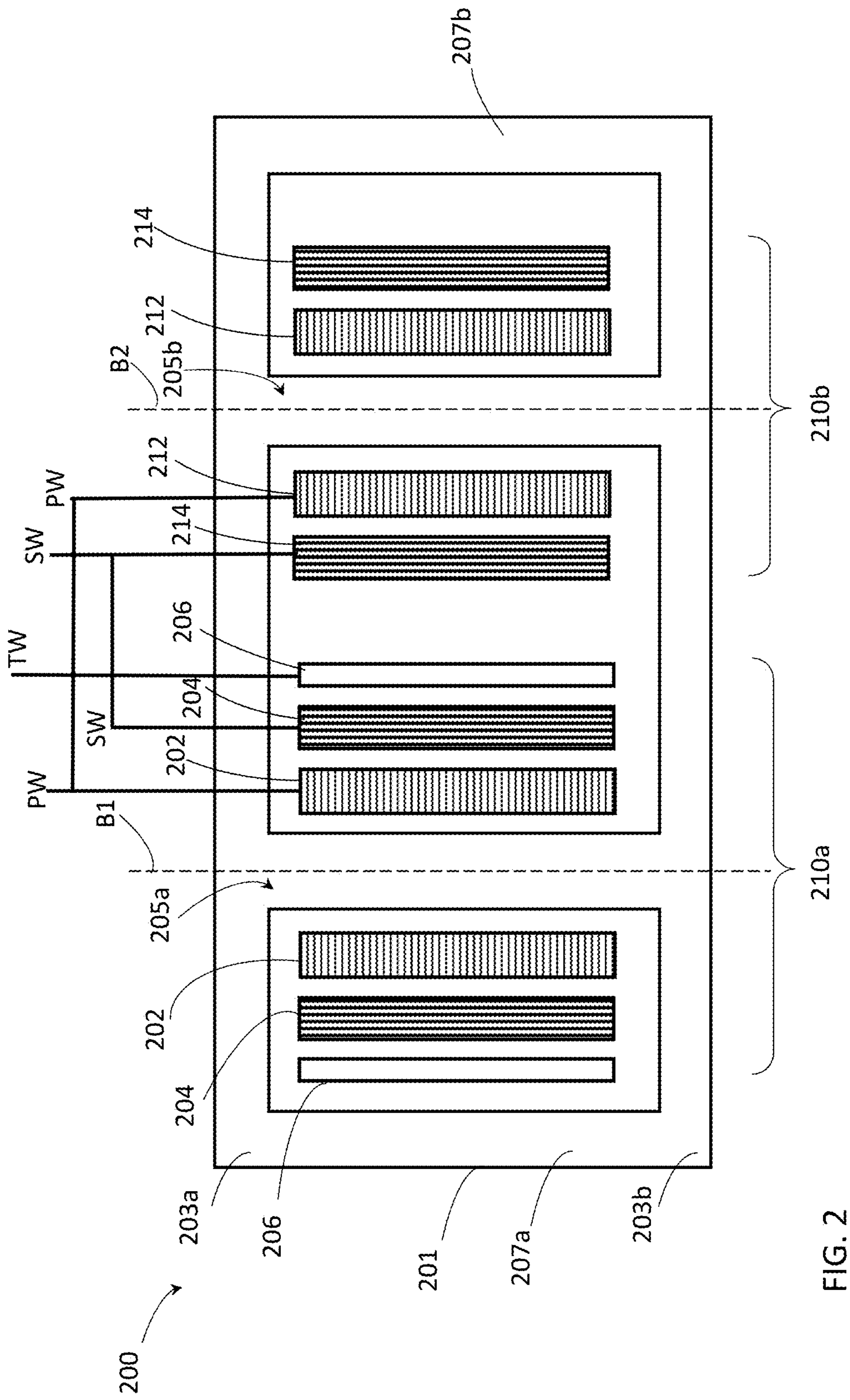
FIG. 2 shows an example of a cross-sectional side view of a transformer comprising two wound limbs, only one of which has a tertiary winding, in accordance with aspects of the present disclosure.

In some aspects, the transformer in accordance with embodiments of the present disclosure comprises at least one single-phase core, e.g., three single-phase cores. A three-phase transformer may be constructed by connecting windings of the three single-phase cores/transformers. FIG. 2 illustrates an example of a transformer 200 according to aspects of the present disclosure. The transformer 200 has a core 201, such as at least one single-phase core, comprising upper and lower yokes 203*a*, 203*b* and a plurality of wound limbs which may comprise two wound limbs, such as vertical wound posts or limbs 205*a*, 205*b* supported by the yokes 203*a*, 203*b*. The yokes 203*a*, 203*b* may be parallel to the plurality of wound limbs. The single-phase core 201, such as an iron core, provides a single-path magnetic circuit. The limbs 205*a*, 205*b*, and other limbs having windings around them, are referred to herein as wound limbs. It should be appreciated that the two wound core limbs 205*a*, 205*b*, which are referred to herein as first and second limbs 205*a*, 205*b*, respectively, are shown by way of example only, as the transformer 200 may have more than two wound limbs.

The transformer 200 is shown in a vertical cross-section taken along a central diameter of cylinder-like or cylindrical structures formed by the windings of the transformer 200. The transformer 200 may be a single-phase transformer.

In some embodiments, the transformer 200 may comprise, or may be, more than one single-phase cores, e.g., three single-phase cores. The three-single phase cores, each being configured e.g., as the transformer 200 or in a similar manner, may be closely connected such that their aggregate may be considered to be a three-phase transformer. Accordingly, the at least one single-phase core 201 may comprise three single-phase cores, and the transformer 200 may be a three-phase transformer constructed by connecting windings of the three single-phase cores. The windings may be connected in any suitable way, e.g., as known in the art. For example, the windings may be connected using Y and/or Delta connections. The tertiary winding may be a stabilizing winding that provides balancing and/or provides auxiliary power to a substation, e.g., a High Voltage Direct Current (HVDC) converter station. The tertiary winding may be a Delta-connected winding.

The transformer 200 comprises primary and secondary concentric windings formed on each limb of the plurality of wound limbs 205*a*, 205*b*. Each of the primary windings is connected to an AC supply and each of the secondary windings is connected to an electrical component (load). The transformer 200 also comprises a tertiary concentric winding, concentric with the primary and secondary windings, formed on at least one limb of the plurality of wound limbs 205*a*, 205*b* such that fewer than all wound limbs of the plurality of limbs have the tertiary winding. The tertiary winding provides balancing and/or auxiliary power. The windings may be coils of a wire forming a hollow cylinder-like wound structure that is positioned around a respective wound limb, such as a portion of the ferromagnetic core, such that the limb passes through the cylinder-like wound structure The primary, secondary (and, for some wound limbs, tertiary windings) are positioned in a concentrical arrangement around the limb to form a respective cylinder-like winding or structure. Each of the windings forms a respective layer in the cylinder-like structure.

As shown in FIG. 2, the windings of the transformer 200, power among which is split, may be connected in parallel to achieve the full power. In some cases, the windings may be connected in series. As shown in FIG. 2, the primary windings 202, 212, marked as "PW" may be connected to each other. Similarly, the secondary windings 204, 214, marked as "SW", may be connected to each other. The single tertiary winding 206 is marked as "TW". The primary windings 202, 212 may be considered as connected to or including a primary voltage system of the transformer 200, the secondary windings 204, 214 may be considered as connected to or including a secondary voltage system of the transformer 200, and the tertiary winding 206 may be considered as connected to or including a tertiary voltage system of the transformer 200.

In FIG. 2, the single-phase core 201 of the transformer 200 comprises first and second outer side limbs 207*a*, 207*b* formed parallel to the limbs of the plurality of wound limbs, the side limbs 207*a*, 207*b* being without windings formed therearound. It should also be appreciated that, in some configurations of a transformer in accordance with the present disclosure, the transformer may not have outer limbs. As shown in FIG. 2, the first and second wound limbs 205*a*, 205*b* have respective first and second cylinder-like or cylindrical structures 210*a*, 210*b* formed around them. The first and second cylindrical structures 210*a*, 210*b* may be cylinder-like, meaning that their shapes may deviate from an exact cylindrical shape, but they are generally cylindrical and are therefore referred to herein as cylindrical structures. In each of the cylindrical structures, an axis of rotation may be located in a center of the core, i.e., in the center of the respective wound limb. Each of the first and second cylindrical structures 210*a*, 210*b* is formed by respective windings that are wound in a sleeve-like manner, in a concentric arrangement, around a respective (wound) limb. Longitudinal axes B1 and B2 of the first and second cylindrical structures 210*a*, 210*b* may coincide with longitudinal axes of the first and second wound limbs 205*a*, 205*b*, respectively.

The first wound limb 205*a* has a primary concentric winding 202, a secondary concentric winding 204, and a tertiary concentric winding 206 formed thereon, thereby forming the first cylindrical structure 210*a*. The primary and secondary windings 202, 204 are concentric relative to one another, and the tertiary winding 206 is concentric with the primary and secondary windings 202, 204. Thus, in this example, the at least one limb having the tertiary winding formed thereon is one limb, i.e., the first wound limb 205*a*. As mentioned above, the core 201 is referred to as a single-phase core, and the at least one limb having the tertiary winding formed thereon may be referred to as one limb per phase.

The second wound limb 205*b* has a primary winding 212 and a secondary winding 214 formed thereon, thereby forming the second cylindrical structure 210*b*. As shown in FIG. 2, the first wound limb 205*a* includes one primary winding 202, one secondary winding 204, as well as the tertiary winding 206 formed thereon. As also shown in FIG. 2, the second wound limb 205*b* includes one primary winding 212 and one secondary winding 214 formed thereon.

The first and second wound limbs 205*a*, 205*b* have the same or similar respective primary and secondary windings, such that the main windings are essentially identical among the first and second wound limbs 205*a*, 205*b*. The primary windings 202, 212 may be connected to each other in parallel, and the secondary windings 204, 214 may be connected to each other in parallel. In some case, however, the primary and secondary windings may be connected in series.

In some examples, with reference to the first wound limb 205*a*, the primary and secondary windings 202, 204 may have a higher rated power than the tertiary winding 206. For example, the primary and secondary windings may have a voltage in the range of from about 30 kV to about 800 kV. The tertiary winding 206 formed on the at least one limb of the plurality of wound limbs may be a lower-voltage winding than the primary and secondary windings. For example, the tertiary winding 206 may have voltage in the range of from about 10 kV to about 36 kV.

In some implementations, there may be different types of combinations of voltage levels on the primary and secondary windings (also referred to as main windings), depending on application: for example, from about 60 kV to about 400 kV, or from about 245 kV to about 400 kV, or from about 300 KV to about 400 kV, or from about 400 kV to about 750 kV, or from about 500 KV to about 800 kV, etc. It should be appreciated that aspects in accordance with the present disclosure are not limited to any specific voltage ranges for any of the transformer windings.

In some embodiments, a regulating winding is connected, e.g., in series with one of the main windings, and the amount of turns connected can be changed, e.g., with the use of a tap changer. This may be used to regulate the number of turns and thereby adjust the voltage. In some implementations, the tertiary winding may be located between the primary winding or secondary winding, and the regulating winding.

As shown in the example of FIG. 2, with reference to the first wound limb 205*a*, the tertiary winding 206 formed on the at least one limb of the plurality of wound limbs may be an outermost winding relative to primary and secondary concentric windings 202, 204 formed on the limb 205*a* having the tertiary concentric winding 206.

Furthermore, in some examples, the tertiary winding formed on the at least one limb of the plurality of wound limbs may be radially innermost relative to primary and secondary concentric windings formed on the at least one limb having the tertiary concentric winding. The tertiary winding may thus be a radially innermost winding in a cylinder-like structure formed by windings of the transformer. It should be appreciated, however, that embodiments herein are not limited to a specific way in which the tertiary winding is disposed relative to the primary and secondary windings, as well as other windings that may be included. For example, in some cases, the transformer 200 may comprise a regulating winding. The tertiary winding may be located between the primary winding or secondary winding and the regulating winding. The tertiary winding may also be radially innermost or outermost when the transformer additional includes the regulatory winding on each of its wound limbs.

The first and second cylindrical structures 210*a*, 210*b* may have respective different configurations in that the first structure 210*a* includes the tertiary winding 206. The first and second cylindrical structures 210*a*, 210*b* may thus be manufactured with some differences, due to the presence of the tertiary winding 206 in the first cylindrical structure 210*a* and absence of such winding in the second cylindrical structure 210*b*. For example, insulation build up, pressure applied to the windings, and other features may be different.

At the same time, considering a relatively small size of a tertiary winding relative to the main windings, changes needed to account for the difference in the windings may be considered small in comparison with the achieved benefits. The benefits include, e.g., a reduced short-circuit current and forces on limbs without tertiary winding(s), possibility to use space on limbs without tertiary winding(s), reduction in weight, and a reduction in number of windings that may potentially fail which increases a reliability of the transformer. Furthermore, having a tertiary winding on fewer than all wound limbs allows reducing costs of the transformer.

In some aspects, the transformer, such as the transformer 200, has different number of voltage systems represented on different wound limbs of the plurality of limbs. For example, in FIG. 2, three voltage systems (primary, secondary, and tertiary) are represented on the first wound limb 205*a*, while two voltage systems (primary and secondary) are represented on the second wound limb 205*b*. Thus, the transformer 200 has the windings connected to or included in different number of voltage systems on different wound limbs of the plurality of wound limbs (205*a*, 205*b*).

In some embodiments, a short-circuit current for equipment connected to the transformer is reduced as compared to a transformer having a tertiary winding on all of wound limbs thereof. The short-circuit power delivered from to a tertiary voltage system, when considered under idealized conditions (i.e., infinite short circuit power of the suppling voltage system and no other impedance than the transformer), may be taken as approximately the same from each limb with a tertiary winding. As a result, the short circuit current may be significantly reduced by omitting a tertiary winding on one or more of wound limbs. As an example, providing a tertiary winding on one wound limb instead of two wound limbs may reduce the short circuit current by up to approximately 50%.

The transformer impedance may be a largest or dominating impedance, but there will be other impedances as well. The short circuit impedance to the tertiary winding may be increased when fewer wound limbs have the tertiary winding, which in turn greatly reduces short-circuit current.

In some cases, a short-circuit current may be reduced proportionally to a number of limbs in the plurality of wound limbs without the tertiary concentric winding formed thereon; however, the proportionality is approximate. For example, for a transformer with two wound limbs one of which has a tertiary winding, the short-circuit current may be reduced by up to approximately up to ½. As another example, for a transformer with three wound limbs one of which has a tertiary winding, the short-circuit current may be reduced by up to approximately ⅔. As discussed above, due to impedances, the reduction is approximate, i.e., within about 10%, or about 15%, or about 20%, or greater than 20%. In some cases, the reduction in the short-circuit current may not be directly (with approximation) proportional to a number of limbs in the plurality of wound limbs without the tertiary concentric winding formed thereon. Nevertheless, in any case, a short-circuit current for equipment connected to the transformer will be reduced in a transformer in accordance with the present disclosure—with a tertiary winding on fewer than all wound limbs, as compared to a transformer having a tertiary winding on all of its wound limbs.

Referring back to FIG. 2, the second wound limb 205*b* of the transformer 200 lacks a tertiary winding. Accordingly, in the transformer 200, the tertiary concentric winding 206 is formed on only the first wound limb 205*a* of the plurality of wound limbs 205*a*, 205*b* such that fewer than all limbs of the plurality of limbs 205*a*, 205*b* have the tertiary winding.

A transformer like the transformer 200, or a similar transformer configured in accordance with aspects of the present disclosure, may be used in high power systems, e.g., in systems used in High Voltage Direct Current (HVDC) technology applications. The HVDC may be based on Line Commutated Converter (LCC) and/or Voltage Source Converter (VSC) technologies. Such systems may include one or more voltage systems with lower power requirements than other of the voltage systems included in the larger system. Forming a tertiary winding on fewer than all wound limbs, e.g., on one limb as in the example of FIG. 2, in accordance with the present disclosure, may provide various advantages. For example, short-circuit current, which may be high in low power voltage systems, may be reduced, which results in reducing the need for current limiting reactors and/or other equipment or dimensioning downstream equipment for high short-circuit current. Furthermore, reductions in the total number of windings in the transformer leads to cost savings. As another advantage, in manufacturing, it is possible to reduce distances between the core limbs, as radial build of windings on the limb without tertiary windings may be reduced, which in turn results in reduced cost and reduced material and energy losses. As a further advantage, due to reduced short-circuit forces on one or more wound limbs without tertiary windings, the transformer designed in accordance with the present disclosure may have increased reliability and/or reduced requirements for mechanical support systems on the wound limbs without tertiary windings.

In FIG. 2, the transformer 200 is shown to have the first and second wound limbs 205*a*, 205*b* by way of example only, as the transformer 100 may have three, four or greater than four wound limbs. Regardless of the specific number of the wound limbs of the transformer, fewer than all of its wound limbs have a tertiary winding formed around them.

Figure 3:
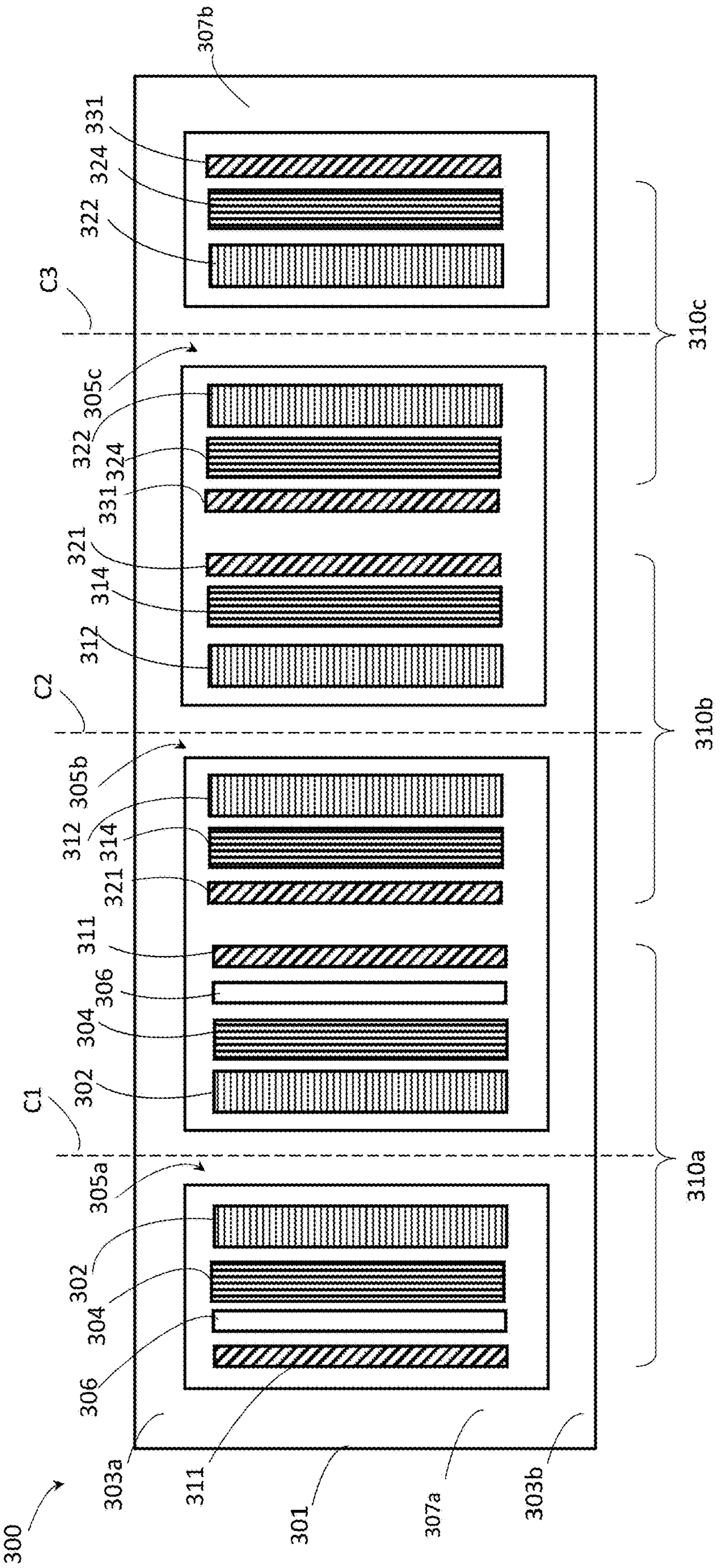
FIG. 3 shows another example of a cross-sectional side view of a transformer comprising three wound limbs, only one of which has a tertiary winding, in accordance with aspects of the present disclosure.

FIG. 3 illustrates another example of a transformer 300 according to aspects of the present disclosure, wherein the transformer 300 has a plurality of wound limbs comprising three wound limbs and two outer, side limbs. As shown in FIG. 3, the transformer 300 has a core 301, such as a single-phase core, comprising upper and lower yokes 303*a*, 303*b* and three wound posts or limbs 305*a*, 305*b*, 305*c* supported by the yokes 303*a*, 303*b*. It should be appreciated that the three wound limbs 305*a*, 305*b*, 305*c*, which are referred to herein as first, second, and third limbs, respectively, are shown by way of example only. The transformer 300 also has first and second side limbs 307*a*, 307*b*. It should also be appreciated that, in some configurations of a transformer in accordance with the present disclosure, the transformer may not have side limbs.

The transformer 300 is shown in a vertical cross-section taken along a center of the core 301 and central diameter of cylinder-like or cylindrical structures formed by windings of the transformer 300. The transformer 300 may be a single-phase transformer. In some embodiments, the transformer 300 may be a three-phase transformer. For example, the single-phase core 301 may comprise three single-phase cores, and the transformer 300 may be a three-phase transformer constructed by connecting windings of the three single-phase cores.

As shown in FIG. 3, the first, second, and third wound limbs 305*a*, 305*b*, 305*c* have respective first, second, and third cylinder-like or cylindrical structures 310*a*, 310*b*, 310*c* formed around them. Longitudinal axes C1, C2, and C3 of the cylindrical structures 310*a*, 310*b*, 310*c* may coincide with longitudinal axes of the first, second, and third wound limbs 305*a*, 305*b*, 305*c*, respectively.

The first wound limb 305*a* has a primary winding 302, a secondary winding 304, a tertiary winding 306, and a regulating winding 311 formed thereon, with the windings 302, 304, 306, 311 forming the cylindrical structure 310*a*. The second wound limb 305*b* has a primary winding 312, a secondary winding 314, and a regulating winding 321 formed thereon, with the windings 312, 314, 321 forming the cylindrical structure 310*b*. Similarly to the second wound limb 305*b*, the third wound limb 305*c* has a primary winding 322, a secondary winding 324, and a regulating winding 331 formed thereon, with the windings 322, 324, 331 forming the cylindrical structure 310*c*. Accordingly, in the transformer 300, only one of the first, second, and third wound limbs 305*a*, 305*b*, 305*c*, such as the first wound limb 305*a*, has a tertiary winding disposed concentrically around it. The second and third wound limbs 305*b*, 305*c* have formed thereon respective cylindrical structures 310*b*, 310*c* which do not include a tertiary winding.

In this example, the tertiary winding 306 is positioned between the secondary winding 304 and the regulating winding 311, together positioned over the first wound limb 305*a*. In other examples, however, the tertiary winding 306 may be positioned between the primary winding 302 and the regulating winding 311. In other examples, the tertiary winding 306 may be radially innermost or outermost relative to the primary winding 302, secondary winding 304, and regulating winding 311. The windings may be positioned in any suitable concentric arrangement around the respective transformer limbs.

In some embodiments, as shown in FIG. 3, a regulating winding 311 is connected in series with one of the main windings, and the amount of turns connected can be changed, e.g., with the use of a tap changer. This may be used to regulate the number of turns and thereby adjust the voltage. The tertiary winding may be located between the primary winding or secondary winding and the regulating winding. Thus, as shown by way of example in FIG. 3, the tertiary winding 306 may be located between the secondary winding 304 and the regulating winding 311. It should be noted that the regulating winding may be positioned in other ways relative to the other windings, which may be different from the arrangement as shown in FIG. 3. Also, fewer than all wound limbs may have a regulating winding, such that not all of the wound limbs of a transformer will have, in addition to other windings, a regulating winding.

The structure of the transformer 300 shown in FIG. 3 is similar to the structure of the transformer 200 of FIG. 2, and the transformer 300 is therefore not discussed in further detail herein. Furthermore, the transformer 300, having the tertiary winding 306 formed on only one of the first, second, and third wound limbs 305*a*, 305*b*, 305*c*, provides advantages similar to those provided by the transformer 200 of FIG. 2.

Figure 4:
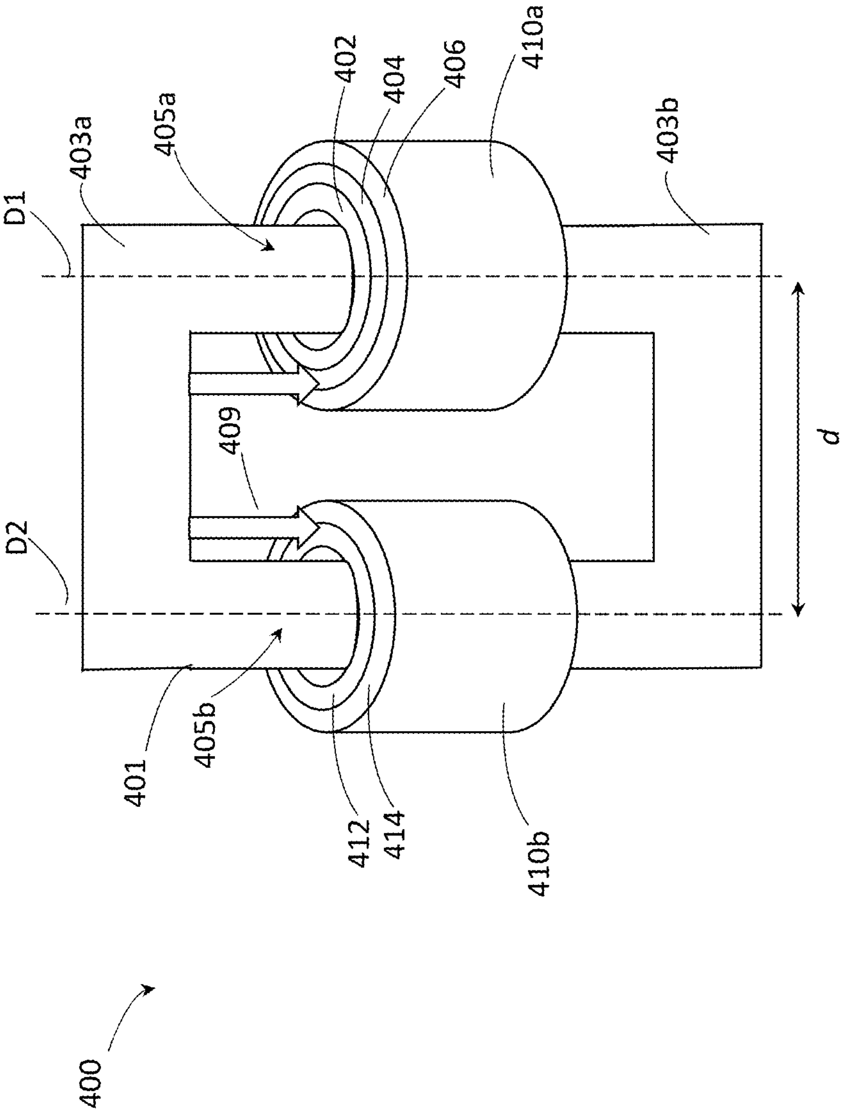
FIG. 4 shows an example of a perspective side view of a transformer comprising two wound limbs one of which has a tertiary winding, in accordance with aspects of the present disclosure.

FIG. 4 illustrates another example of a transformer 400 according to aspects of the present disclosure. The transformer 400 may be a single-phase transformer. In some embodiments, the transformer 400 may be a three-phase transformer. The transformer 400 comprises a core 401, such as a single-phase core 401, comprising upper and lower yokes 403*a*, 403*b* and a plurality of wound limbs comprising first and second vertical wound posts or limbs 405*a*, 405*b* supported by the yokes 403*a*, 403*b*. It should be appreciated that the two wound limbs 405*a*, 405*b* are shown by way of example only, as the transformer 200 may have more than two wound limbs. The transformer 400 does not include side limbs. FIG. 4 also shows that the transformer 400 has support elements 409, two of which are shown by way of example. Any number of support elements of any suitable shape and size may be used in this or any other transformer in accordance with aspects of the present disclosure.

As shown in FIG. 4, the first and second wound limbs 405*a*, 405*b* have respective first and second cylinder-like or cylindrical structures 410*a*, 410*b* formed around them. Longitudinal axes D1, D2 of the first and second cylindrical structures 410*a*, 410*b* may coincide with longitudinal axes of the first and second wound limbs 405*a*, 405*b*, respectively.

The first wound limb 405*a*, shown on the right in this example, has a primary winding 402, a secondary winding 404, and a tertiary winding 406 formed thereon, with the windings 402, 404, 406 forming the first cylindrical structure 410*a*. The second wound limb 405*b*, shown on the left in this example, has a primary winding 412 and a secondary winding 414 disposed thereon and that together form the second cylindrical structure 410*b*. The second wound limb 405*b* lacks a tertiary winding. As in examples of FIGS. 2 and 3, placing the tertiary winding on fewer than all (one, in this example) wound limbs may provide various advantages discussed above. In some cases, an overall volume of a cylindrical structure which does not include a tertiary winding may be smaller than would be with such winding. As shown in FIG. 4, a distance d between centers of the first and second cylindrical structures 410*a*, 410*b* may be reduced due to only the first cylindrical structure 410*a* having the tertiary winding 406. This allows reducing the overall size of the transformer. A reduction in the number of windings also results in a smaller weight of the transformer, thereby reducing manufacturing and transport (due to weight) costs.

As another advantage, in manufacturing, in some cases, it may be possible to reduce distances between the core limbs, as radial build of windings on the limb without tertiary windings may be reduced, which in turn additionally results in reduced cost and reduced material and energy losses. As a further advantage, due to reduced short-circuit forces and one or more wound limbs without tertiary windings, the transformer designed in accordance with the present disclosure may have increased reliability and/or reduced requirements for mechanical support systems on the wound limbs without tertiary windings.

As discussed above, a transformer comprising at least one single-phase core in accordance with aspects of the present disclosure may have two wound limbs and two side limbs, for example, as shown in the example of FIG. 2. The transformer may alternatively have two wound limbs and no side limbs, as shown in the example of FIG. 4. The transformer may alternatively have three wound limbs and two side limbs, as shown in the example of FIG. 3. Other transformer configurations are possible as well. Additionally, it should be appreciated that a transformer in accordance with aspects of the present disclosure includes various other components, e.g., bushings, insulation, transformer oil, cooling arrangements, protection relays, etc., that are not shown herein for the sake of brevity. The transformer may be disposed within an enclosure, such as e.g., a tank, which is also not shown. Regardless of their specific structure, a transformer in accordance with aspects of the present disclosure allows reducing short-circuit currents as well as reducing costs through size and weight reduction and improved manufacturability and transportability.

It should be appreciated that transformers, and their components, shown in FIGS. 1-4 are not drawn to scale, and that any proportions of the components in FIGS. 1-4 are shown for illustration purposes only.

A transformer in accordance with aspects of the present disclosure, such as the transformer 200 of FIG. 2, or transformers 300 (FIG. 3) and 4 (FIG. 4) described herein, are configured such that the aspects of the present disclosure provide a method for reducing a short-circuit current generated by a transformer comprising a single-phase core that comprises a plurality of wound limbs. The method comprises forming primary and secondary concentric windings on each limb of the plurality of wound limbs of the transformer; and forming a tertiary concentric winding, concentric with the primary and secondary windings, on at least one wound limb of the plurality of wound limbs such that fewer than all limbs of the plurality of wound limbs have the tertiary winding.

In some embodiments, the at least one limb having the tertiary winding formed thereon is one, e.g., a single limb. In embodiments in which the transformer comprises more than one, e.g., three, single-phase cores with the windings of the cores connected to form a three-phase transformer, the at least one limb having the tertiary winding formed thereon may be one limb per phase. Each of the single-phase cores that are used together to construct the three-phase transformer may have the at least one (but fewer than all) limb, e.g., one limb, having the tertiary winding arranged around it. The transformer in accordance with aspects of the present disclosure may thus be said to have one limb per phase having the tertiary winding formed thereon. Thus, the three-phase transformer, may have three limbs (one per phase) each having the tertiary winding formed thereon. In some embodiments, the at least one limb having the tertiary winding formed thereon comprises more than one, e.g., two or more, wound limbs which are fewer than all limbs of the plurality of wound limbs. The two or more, but fewer than all, limbs may be limbs per phase, such that a three-phase transformer, constructed from three single-phase cores each having two or more of such limbs, will have six or more, but fewer that all, of its multiple limbs having the respective tertiary windings formed thereon.

The transformer may have side limbs formed parallel to the limbs of the plurality of wound limbs, the side limbs being without windings formed therearound.

In the transformer which may implement the method for reducing a short-circuit current generated by the transformer, the primary and secondary windings may have a higher rated power than the tertiary winding. The tertiary concentric winding formed on the at least one limb of the plurality of wound limbs may be a lower-voltage winding than the primary and secondary winding.

In the transformer, the tertiary concentric winding formed on the at least one limb of the plurality of wound limbs may be radially outermost relative to primary and secondary concentric windings formed on the at least one limb having the tertiary concentric winding. In some cases, the tertiary concentric winding formed on the at least one limb of the plurality of wound limbs may be radially innermost relative to primary and secondary concentric windings formed on the at least one limb having the tertiary concentric winding.

In some implementations, additionally or alternatively, the transformer may comprise a regulating winding. The tertiary winding may be located between the primary winding or secondary winding and the regulating winding. In some implementations, the tertiary concentric winding formed on the at least one limb of the plurality of wound limbs may be outermost or innermost in the transformer having the regulating winding.

The plurality of wound limbs in the transformer may comprise two wound limbs.

In some implementations, the single-phase core further comprises side limbs formed parallel to the limbs of the plurality of wound limbs, the side limbs being without windings formed therearound.

In aspects of the present disclosure, the transformer has different number of voltage systems represented on different wound limbs of the plurality of limbs. In other words, the transformer has windings connected to or included in different number of voltage systems on different wound limbs. For example, some, but fewer than all, of the wound limbs may comprise primary, secondary, and tertiary windings, whereas one or more of the wound limbs may comprise primary and secondary windings but not tertiary winding(s). The transformer may also comprise regulatory windings on some or all of the wound limbs.

The transformer may be a single-phase transformer. A single-phase core of the transformer, with windings arranged around its limbs. may be referred to as a transformer when the transformer is a single-phase transformer. In some implementations, the at least one single-phase core of the transformer comprises three single-phase cores, such that the transformer may be a three-phase transformer constructed by connecting windings of the three single-phase cores.

In the method in accordance with aspects of the present disclosure, a short-circuit current for equipment connected to the transformer may be reduced as compared to a transformer having a tertiary winding on all of wound limbs thereof. For example, in some cases, in a transformer that comprises two wound limbs and only one of them has, in addition to the other windings, a tertiary winding, the short-circuit current may be reduced by up to approximately half (½).

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

In the description of the present disclosure, it is to be understood that the terms "center", "longitudinal", "lateral", "upper", "lower", "front", "back", "left", "right", "vertical", "horizontal", "top", "bottom", "inner", "outer", and the like, indicate orientations or positional relationships based on those shown in the drawings, and are used only for convenience in describing the present disclosure and for simplicity in description, and do not indicate or imply that the referenced devices or elements must have a particular orientation, be constructed and operated in a particular orientation, and thus, are not to be construed as limiting the present disclosure.

As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It should be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

Further, as used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A transformer, comprising:

a single-phase core comprising:

a plurality of wound limbs;

primary and secondary concentric windings formed on each limb of the plurality of wound limbs; and a tertiary concentric winding concentric with the primary and secondary windings, formed on at least one limb of the plurality of wound limbs such that fewer than all limbs of the plurality of wound limbs have the tertiary winding, wherein the tertiary concentric winding provides balancing and/or auxiliary power, wherein the tertiary concentric winding is unconnected mechanically to any winding formed on any of the plurality of wound limbs distinct from the at least one limb, and wherein the tertiary concentric winding is positioned radially outermost relative to the primary and secondary concentric windings formed on the at least one limb, wherein the tertiary concentric winding formed on the at least one limb of the plurality of wound limbs is a lower-voltage winding than the primary and secondary windings.

2. The transformer of claim 1, wherein the at least one limb having the tertiary winding formed thereon is one limb.

3. The transformer of claim 1, wherein the at least one limb having the tertiary winding formed thereon is one limb per phase.

4. The transformer of claim 1, wherein the primary and secondary windings have a higher rated power than the tertiary winding.

5. The transformer of claim 1, wherein the tertiary concentric winding formed on the at least one limb of the plurality of wound limbs is radially innermost relative to primary and secondary concentric windings formed on the at least one limb having the tertiary concentric winding.

6. The transformer of claim 1, further comprising a regulating winding.

7. The transformer of claim 1, wherein the plurality of wound limbs comprise two limbs.

8. The transformer of claim 1, wherein the single-phase core further comprises side limbs formed parallel to the limbs of the plurality of wound limbs, the side limbs being without windings formed therearound.

9. The transformer of claim 1, wherein the transformer has the windings connected to or included in different number of voltage systems on different wound limbs of the plurality of wound limbs.

10. The transformer of claim 1, wherein the single-phase core comprises one single-phase core, and wherein the transformer is a single-phase transformer.

11. The transformer of claim 1, wherein the single-phase core comprises three single-phase cores, and wherein the transformer is a three-phase transformer constructed by connecting windings of the three single-phase cores.

12. A method of reducing a short-circuit current generated by a transformer comprising a single-phase core comprising a plurality of wound limbs, the method comprising:

forming primary and secondary concentric windings on each limb of the plurality of wound limbs of the transformer; and forming a tertiary concentric winding, concentric with the primary and secondary windings, on at least one limb of the plurality of wound limbs such that fewer than all limbs of the plurality of wound limbs have the tertiary winding, wherein the tertiary concentric winding provides balancing and/or auxiliary power, wherein the tertiary concentric winding is unconnected mechanically to any winding formed on any of the plurality of wound limbs distinct from the at least one limb, and wherein the tertiary concentric winding is positioned radially outermost relative to the primary and secondary concentric windings formed on the at least one limb, wherein the tertiary concentric winding formed on the at least one limb of the plurality of wound limbs is a lower-voltage winding than the primary and secondary windings.

13. The method of claim 12, wherein the at least one limb having the tertiary winding formed thereon is one limb per phase.

14. The method of claim 12, wherein the transformer further includes side limbs formed parallel to the limbs of the plurality of wound limbs, the side limbs being without windings formed therearound.

15. The transformer of claim 1, wherein the primary concentric windings are connected to each other in parallel on the plurality of wound limbs and the secondary concentric windings are connected to each other in parallel on the plurality of wound limbs.

16. The method of claim 12, wherein the primary concentric windings are connected to each other in parallel on the plurality of wound limbs and the secondary concentric windings are connected to each other in parallel on the plurality of wound limbs.

* * * * *